Sept. 8, 1936.  A. F. EVERS, JR  2,053,365

THERMOSTATIC OUTLET VALVE

Filed July 8, 1935  2 Sheets-Sheet 1

Inventor
Adolph F. Evers Jr.

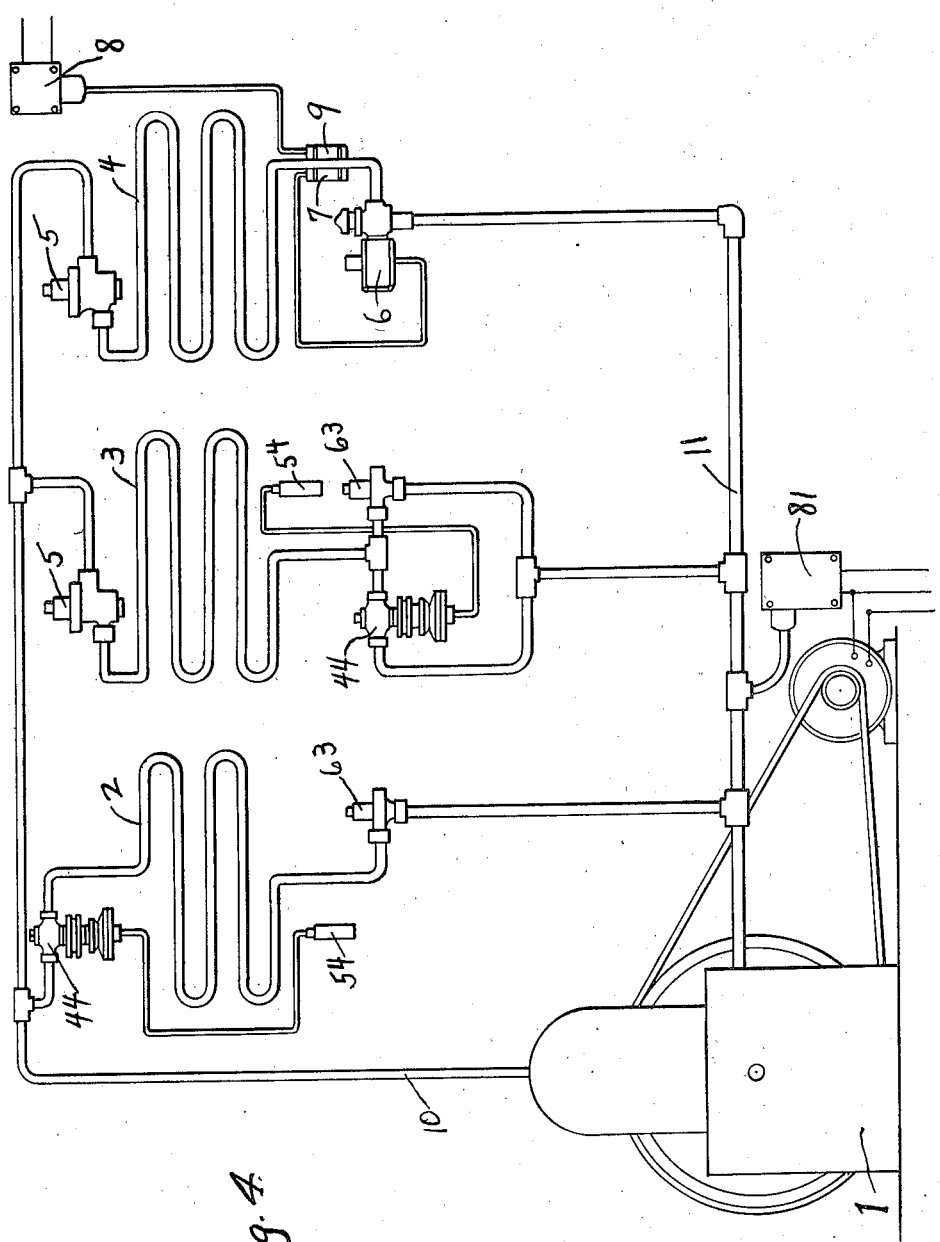

Patented Sept. 8, 1936

2,053,365

UNITED STATES PATENT OFFICE 2,053,365

THERMOSTATIC OUTLET VALVE

Adolph F. Evers, Jr., Denton, Tex.

Application July 8, 1935, Serial No. 30,337

8 Claims. (Cl. 236—92)

My invention relates to improvements in thermostatic outlet valve and it consists in the combinations, constructions and arrangements herein described and claimed.

In particular my invention relates to multi-temperature refrigeration systems where two or more evaporators are maintained at different temperatures by a single compressor. The method employed is of the type whereby an evaporator's temperature is thermostatically controlled at its outlet.

An object of my invention is to provide a comparatively cheap multi-temperature refrigeration system.

A further object is to provide a comparatively simple multi-temperature refrigeration system.

A further object is to provide a thoroughly reliable multi-temperature refrigeration system in which the isolated evaporator has the following control qualifications:

(a) Capability of using a simple pressure reducing inlet valve thereby obtaining a constant refrigerating pressure, (b) Individual self-contained (non-electric) thermostatic outlet control means, (c) An efficient thermostatic outlet valve which both opens wide and closes tightly in a quick, unhesitating manner.

(d) A quick action, pressure actuated thermostatic outlet valve devoid of secondary spring-loaded differential snap mechanisms such as toggle joints, latching devices or snapping spring discs and diaphragms, (e) A reliable thermostatic outlet valve in which the intermediate diaphragm is constantly subject to the evaporator pressure and utilizes same.

Other objects and advantages will appear in the following specification and the novel features of the invention will be particularly pointed out in the appended claims.

My invention is illustrated in the accompanying drawings forming part of this application in which Figure 1 is a vertical sectional view of a well known type of thermostatically controlled valve.

Figure 4 is a diagrammatic representation of a circulating multi-temperature refrigeration system embodying the present invention illustrating three evaporators connected to the system in parallel arrangement.

Figure 3:
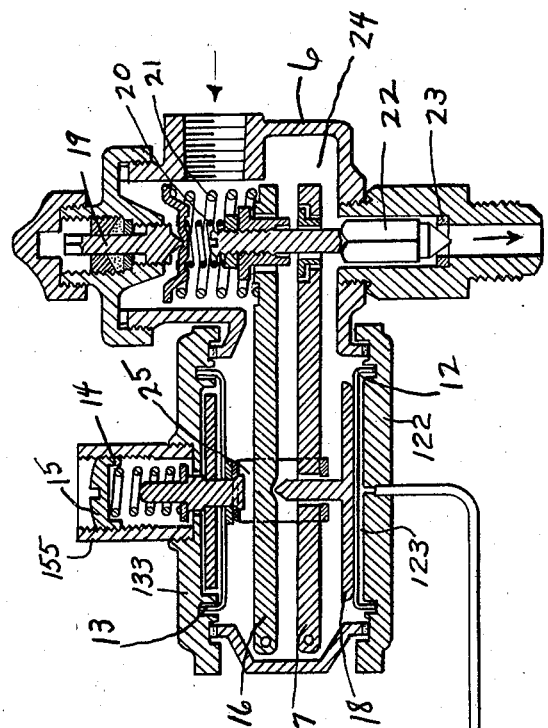
Figure 3 is a vertical sectional view of my new thermostatically controlled outlet valve, same being designed expressly for the circuit described in the following specification.
Figure 2:
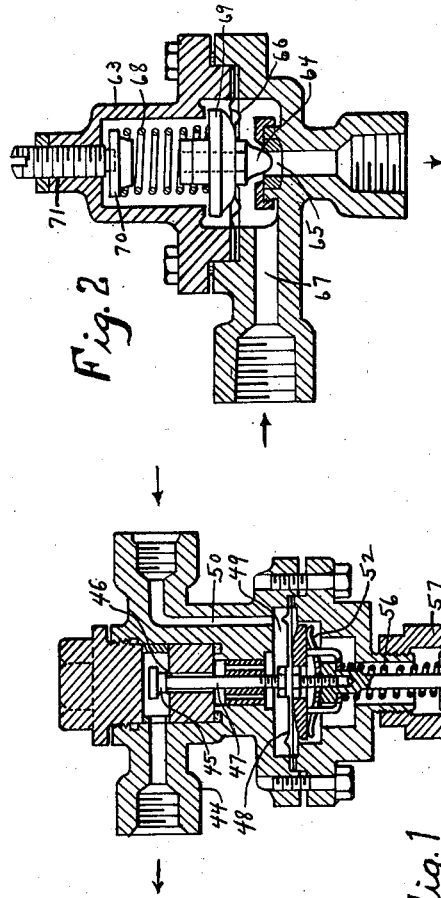
Figure 2 is a vertical sectional view of a well known type of outlet or constant pressure valve.
Figure 1:
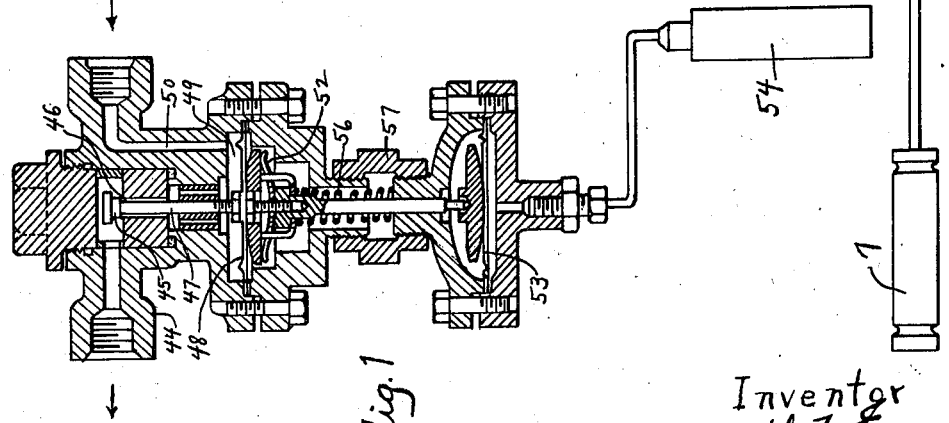

The refrigeration system represented in Figure 4 is complete and includes a high side or complete compressing unit, a low side including the three evaporators 2, 3 and 4 together with their control valves and the necessary electrical controls which may be either of the pressure or the temperature type. Since the operation of a common multi-temperature refrigeration system is well known and as numerous parts of the system represented in Figure 4 are in common usage I shall give a detailed description only of those parts which relate closely to my invention. The control valves 44 and 63 shown in section in Figures 1 and 2 respectively, and their operation are well known so my description of them will be only of a limited nature.

In their old and well known functions the structures 44 and 63 will herein be referred to as valves, but as parts of my new thermostatic outlet valve they will be referred to as mechanisms.

That the novelty of my new thermostatic outlet valve may be more readily understood I shall first outline briefly the functions of the individual structures 44 and 63 as they are now known in connection with refrigeration low sides. Later in this specification I shall show how when the structures 44 and 63 are combined in such a manner as to form my new valve 44—63 the functions of these two structures are novel both individually and in combination.

In Figure 4 the high side 1 together with the evaporator 2 and its controls form a well known type of refrigeration system. Liquid refrigerant coming from the high side 1 is conducted to the thermostatic expansion valve 44 by the liquid line 10. Entering the valve 44 it is here regulated in pressure for efficient heat absorption after which it is passed into the evaporator 2. After passing through the evaporator 2 the refrigerant, now in a gaseous form but still under control, discharges through the outlet valve 63. From here it is conveyed by the suction line 11 back to the high side 1.

The above-described circuit, being well known, will not be dwelt upon in length here. The feature of this circuit which I wish to point out specifically is that its control is effected through the thermostatically controlled inlet valve 44 whose pressure chamber 49 and passageway 50 form an outlet from same for the refrigerant. Also it may be noted the refrigerating cycle occurs only when the valve 63 is open. A more detailed description of this refrigeration circuit may be had by referring to Patent No. 1,185,597—A. H. Eddy—May 30, 1916.

At this point in my description I wish to call attention to the fact that in multi-temperature refrigeration systems the evaporator which requires isolating control mechanism is never the coldest evaporator. Also it may be noted the controls herein referred to unless otherwise specified are refrigerant valves.

In Figure 4 the high side 1 together with the evaporator 3 and its controls 44, 63 and 5 illustrate my new valve's function. Starting with a warm evaporator, liquid refrigerant coming from the high side 1 enters the expansion valve 5. Here its pressure is so regulated that it will absorb heat efficiently at the low temperature which the evaporator 3 is to reach, after which it flows into same. After passing through the evaporator 3 the refrigerant, now in a gaseous form but under a constant set pressure, enters the pressure chamber 49 of the mechanism 44 by way of the passageway 50. Continuing through the open mechanism 44 the refrigerant returns to the high side 1 by way of the suction line 11. Here it may be noted that the refrigerant's path of travel through the outlet mechanism 44 is in reverse order to the direction which it followed in passing through the inlet valve 44 connected to the evaporator 2.

Thus far the action of the evaporator 3 is under the following conditions: the compressor is in motion, the outlet mechanism 63 closed, the pressure in the evaporator 3 at a constant set value and the temperature of the bulb 54 sufficiently high that its liquid's corresponding pressure, which is exerted together with the force of the springs 52 and 56 against the under side of the diaphragm 48, is sufficient to overcome the combined pressures of all opposing regulatory forces which bear against the upper side of the diaphragm. Particular attention is called to the fact that the mechanism 63 remains closed during the entire refrigerating cycle.

In the mechanism 44 which is of an older type using a thermal liquid of low volatility the number of springs used and their arrangement is somewhat different from that of present day valves which generally use a more volatile liquid. The principle of operation, however, remains the same. The regulatory force which bears against the upper side of the diaphragm 48 is, in this instance, the contant or refrigerating pressure in the evaporator 3 which is governed by the inlet valve 5.

Refrigeration taking place the bulb 54 is cooled simultaneously with the evaporator 3 down to a temperature point where its thermal liquid's corresponding pressure on the under side of the diaphragm 48 is insufficient, together with the additional force of the springs 52 and 56, to withstand the constant refrigerating evaporator- pressure which bears against the upper side of this diaphragm. The downward movement of the diaphragm 48 now closes the valve disc 45 first lightly and then firmly against the seat 46 thereby stopping the refrigerating cycle with an unhesitating, complete movement.

To explain this latter action it may be observed that the instant the valve disc 45 is closed lightly the boiling refrigerant in the evaporator 3 raises the pressure in same. The reasons for this occurrence being well known will not be discussed here. Being operable likewise against the diaphragm 48 this increase in pressure is transmitted to the valve disc 45.

Simultaneously the first rise in pressure closes also the expansion valve 5. All three valves connected to the evaporator 3 are now in a closed position. As the boiling refrigerant continues to raise the pressure it is released by the outlet mechanism 63 at a predetermined setting which, in the present instance, is a few pounds per square inch higher in value than the constant or refrigerating pressure heretofore maintained in the evaporator 3 by the expansion valve 5. The outlet mechanism 63 by its setting governs also the starting or cutting in point of the evaporator 3. When the temperature of the evaporator 3 together with that of the bulb 54 rises that number of degrees which corresponds to the difference in the pressure settings of 63 and 5, the thermal pressure on the under side of the diaphragm 48 will rise sufficiently to overcome the upper side opposing back pressure causing the valve disc 45 to open. The pressure in the evaporator 3 now drops to its constant or refrigerating value thereby starting the refrigerating cycle with an unhesitating, complete movement, the valve disc 45 opens to its maximum position, the valve 5 functions in an intermittently open position, refrigeration takes places and the cycle is completed.

With the evaporator 4 I have substituted another form of my new combination outlet valve 6 in place of the special combination of the mechanisms 44 and 63 as shown. This substitution while increasing the cheapness of the valve, nevertheless retains the same operating principle effective with the evaporator 3.

Liquid sulphur dioxide, for example, coming from the high side 1 enters the expansion valve 5. Here its back pressure is reduced to 2 pounds gauge pressure. This value is now held both in the evaporator 4 and the pressure chamber 24 of the valve 6 as long as refrigeration takes place. When the temperature in the evaporator 4 reaches a predetermined low point, 38 degrees Fahrenheit for example, the bulb 7 is cooled sufficiently whereby its liquid's thermal pressure on the underside of the diaphragm 12 is overcome by the combined forces exerted against the upper side of the diaphragm, namely 2 pounds evaporator pressure and springs 20 and 21. The valve 6 is now closed and the boiling refrigerant in the evaporator 4 and the valve 5 causes a rise in pressure in these two members, likewise in the pressure chamber 24 of the valve 6. This rise in pressure firmly closes the valves 5 and 6.

As the refrigerant in the evaporator 4 continues to boil and its pressure rises to 7 pounds per square inch the resistance of the springs 14 and 20, which directly and indirectly, respectively bear against the upper side of the diaphragm 13 together with the refrigerant pressure holding the needle 22 against the seat 23, is overcome causing the needle to be raised.

The valve 6 is now functioning as a pressure relief valve and the pressure in the evaporator 4 remains constant at 7 pounds gauge reading. The remaining refrigerant in the evaporator 4 continues to boil and pass on to the high side 1 until finally only enough is left to maintain the 7 pounds leaving the needle 22 closed. As the temperature of the evaporator 4 together with that of the liquid in the bulb 7 rises the corresponding thermal pressure under the diaphragm 12 increases to the point where it now overcomes all the forces which bear against the upper side of the diaphragm, namely, the refrigerant pressure 7 pounds in addition to the springs 20 and 21. The needle 22 is now raised and the pressure in the evaporator 4 and the valves 5 and 6 is immediately reduced to 2 pounds per square inch, refrigeration takes place and the cycle is completed.

Any interruption in the compressor's motion will, of course, halt the above-described action and possibly permit a pressure higher than 7 pounds to build up in the evaporator 4. However immediately the motor is restarted the performance of the evaporator together with that of its valves will follow the course of action just outlined.

The operation of the evaporator 4 thus far has been without provision for electrical control of the compressor 1. This may be accomplished by using the pressure type thermostatic switch 81 which is so regulated that its turning-on point is not higher than that pressure value which is the lowest possible in the evaporator 4, which in the present illustration is 2 pounds per square inch gauge pressure. This arrangement permits the switch 81 to start the motor immediately the valve 6 is opened. When the valve 6 closes, providing the other evaporators in the system are refrigerated, the switch 81 is opened by the compressor's suction.

Should a temperature type of thermostatic control be desired it may be the switch 8 whose bulb 9 is mounted in close thermal contact with both the evaporator and the bulb 7.

The metering means which I have illustrated in connection with the evaporators 3 and 4 has been the expansion valve 5. I do not limit my new valve's circuit to this type of inlet control. For an example, it is quite possible to use the thermostatic inlet valve 44 shown connected to the evaporator 2 in its same relative position with the evaporator 4. For best results when it is desired to use the inlet valve 44 in conjunction with the evaporator 4 and the outlet valve 6 its bulb 54 should be in loose thermal contact with the evaporator, the same as it is shown with the evaporator 2. Also the thermic receptacle 54 should have only a limited charge of thermal liquid. This arrangement permits the liquid in the bulb 7 to exert both a higher and a lower thermal pressure than the co-incidental value within the bulb 54, or in other words a wider pressure differential, thereby performing in substance the same function relative to the evaporator back pressure as was originally obtained. In this particular arrangement the evaporator's refrigerating pressure may be described as being under limited thermostatic control, thereby properly distinguishing same from the somewhat similar constant pressure condition maintained by the valve 5.

Observing the action of the evaporators 3 and 4 it is now evident that their control is effected thermostatically at their outlets. Starting the cycle with a warm evaporator, upon its temperature reaching a desired low point the controlled refrigerating back pressure overcomes a falling thermostatic pressure. At this point the evaporator is closed, refrigeration is stopped and the control mechanism in a state of balance which may be upset by a change in value of either the back pressure or the thermostatic pressure. By permitting the back pressure to rise only that amount whose equivalent in temperature is the desired differential, the subsequent rise in thermostatic pressure overcomes the back pressure at a desired high temperature thereby opening the evaporator, reducing the back pressure to its refrigerating value and completing the cycle.

While the design of the complete evaporators 3 and 4 is conventional I do not hold my new valve's circuit to these particular forms. Without changing the principle of operation it is quite possible to employ different forms.

For an example, the inlet valve 5 may be close coupled to the outlet valve 44—63 thereby placing the larger part of the evaporator 3 in direct connection with the suction line 11. Such an arrangement would still leave the pressure chambers of both valves to function as parts of the evaporator and the operating principle would remain unchanged.

While the sensitive bulb 7 is shown to be in close thermal contact with the evaporator 4 this relation is not always necessary to the proper operation of my new valve in its form 6. The thermostatic chamber 123 being always in close thermal contact with the outgoing gases serves as a sensitive element and a safeguard against any abnormal creeping of the frost line which might occur along the suction line 11. In some instances the bulb 7 with its capillary tubing may be removed entirely.

Thus while the operating principles of my new valves 44—63 and 6 are the same their arrangements relative to an evaporator can be different.

The structure of each of the two parts of the valve 44—63, being well known, will not be dwelt upon here.

In the structure of the valve 6 I provide a gastight housing 6, a temperature responsive means consisting primarily of the closed volatile liquid chamber 123 formed between the diaphragm 12 and 122, a removable wall of the housing. The chamber 123 extends through capillary tubing to the sensitive bulb 7. The diaphragm 12 is safely positioned between 122, which is a heavy plate, and the retaining plate 18 which pivots against the midsection of the lever 16. The lever 16 is hinged at the one end to a side wall of the housing while the other end is acted upon by the adjustable spring 21 also enclosed within the housing.

The spring 21 opposes the pressure of the volatile liquid. The spring end of the lever 16 terminates under an adjustable nut forming part of the needle 22 while the stuffing-box spindle 19 permits external adjustment of the spring 21.

The temperature responsive means just described bears upwardly against the needle 22 in such manner that a rise in temperature above a pre-determined setting will open the needle permitting refrigeration to take place while a fall in temperature reverses this movement. The small flexible spring 20 is positioned between the spindle 19 and the needle 22 and tends constantly to close the latter.

The structure thus far described is identical in function to the mechanism 44 forming part of the valve 44—63 but neither is capable of functioning alone in this arrangement.

In the structure of the valve 6 I provide also a diaphragm 13 which forms a flexible upper wall of the housing 6 and is acted upon on the under side by the refrigerant pressure within the valve, this pressure being opposed on the upper side by atmospheric pressure in combination with the adjustable spring 14. The upward movement of the diaphragm 13 is safely limited by the removable plate 133 to which it is fastened in a gas-tight manner.

The spring 14 is tensioned by the plug 15 which screws into the cylinder 155, which in turn screws into the upper side of the plate 133. The diaphragm 13 is connected through a flexible joint to the midsection of the lever 17 which is hinged at one end to a side wall of the housing 6 while the other end terminates under an adjustable bushing forming part of the needle 22. Any upward movement of the diaphragm 13 is transmitted to the needle, moving same to open position while a reverse movement permits the spring 20 to reverse the needle.

This secondly described structure is similar in function to the mechanism 63 forming part of the valve 44—63 and serves to vent what small portion of boiling refrigerant is left in the evaporator at the beginning of an off cycle, leaving only a very small quantity of vapor to aid in the valve's control. Neither of the two parts just mentioned is capable of functioning alone in this arrangement.

The levers 16 and 17 bear upward against the needle 22 in such manner that they may work independently to lift same from the seat 23 which is positioned within a removable plug forming an outlet to the valve. The inlet to the valve is formed within the housing. The plates 122 and 133, with gaskets, are fastened tightly to the housing 6 by screws not to be shown in the cross sectional plane.

From the foregoing description it may now be seen that my new thermostatic outlet valve in the form represented by 44—63 may be constructed by combining two refrigeration valve mechanisms now on the market, namely, a simple two-temperature or pressure relief valve and a thermostatic expansion or thermal valve. In my combination neither of these two mechanisms functions as it has ever functioned before, either individually or in combination. In my new thermostatic snap-action outlet valve 44—63 the pressure relief valve mechanism 63 functions in closed position during the entire refrigerating cycle while the thermostatic expansion valve mechanism 44 functions properly by virtue of its reversed fluid connections, the function of each mechanism being mutually dependent upon the other.

I claim:

1. In a temperature control device for evaporators in which the refrigerating pressure is constant the combination of an evaporator, a thermostatic bulb adapted to be placed within the space to be refrigerated, a valve casing communicating with the outlet of said evaporator, said valve casing enclosing a valve for controlling the flow of refrigerant from said evaporator and normally biased to closed position, a first diaphragm-lever means for opening said valve at a given high pressure in the evaporator and a second diaphragm-lever means exposed on one side to the pressure in said evaporator and on the other side to the pressure of said thermostat for also opening said valve.

2. A temperature control device for evaporators in which the refrigerating pressure is constant, comprising a valve casing having an inlet and an outlet passage communicating therewith for connecting same between the evaporator and the suction line, a valve disposed in said outlet passage for controlling the flow of refrigerant therethrough, an expansible chamber arranged in both the upper and lower left ends of said valve casing, each of said chambers being provided with an end wall adapted for vertical movement in response to variations in pressure conditions in said valve casing, the lower end wall being subject also to fluctuating pressures within said lower chamber, the movement of each end wall being individually transmitted to said valve through levers whose one end hinges to the left side wall of said valve casing and whose other end terminates under an adjustable member forming part of the stem of said valve, an adjustable spring member together with atmospheric pressure bearing downward against said upper movable end wall, a second spring member arranged within said valve casing between the movable end of that lever responsive to said lower movable end wall and an externally adjustable spindle, a third spring member serving individually to close said valve and being positioned between same and said spindle, said spindle being operable through a stuffing-box while serving to vary the pressure of said second spring, and a thermally expansible fluid enclosed in said lower chamber.

3. A temperature control device for evaporators in which the refrigerating pressure is constant, comprising a valve casing having an inlet and an outlet passage communicating therewith for connecting same between the evaporator and the suction line, a valve disposed in said outlet passage for controlling the flow of refrigerant therethrough, an expansible chamber arranged in both the upper and lower left ends of said valve casing, each of said chambers being provided with an end wall adapted for vertical movement in response to variations in pressure conditions in said valve casing, the lower end wall being subject also to fluctuating pressures within said lower chamber, the movement of each end wall being individually transmitted to said valve through levers whose one end hinges to the left side wall of said valve casing and whose other end terminates under an adjustable member forming part of the stem of said valve, an adjustable spring member together with atmospheric pressure bearing downward against said upper movable end wall, a second spring member arranged within said valve casing between the movable end of that lever responsive to said lower movable end wall and an externally adjustable spindle, a third spring member serving individually to close said valve and being positioned between same and said spindle, said spindle being operable through a stuffing-box while serving to vary the pressure of said second spring, a thermally expansible fluid enclosed in said lower chamber and auxiliary means for rendering same responsive to the temperature of the evaporator.

4. In a temperature control device for evaporators in which the refrigerating pressure is constant, the combination of an evaporator, a valve casing communicating with the outlet of said evaporator, said valve casing enclosing a valve for controlling the flow of refrigerant from said evaporator and normally biased to closed position, a first diaghragm-lever means for opening said valve at a given high pressure in the evaporator and a second diaphragm-lever means exposed on one side to the pressure in said evaporator and on the other side to the pressure of a thermally expansible fluid for also opening said valve.

5. A temperature control device, for evaporators in which the refrigerating pressure is constant, comprising a valve casing having an inlet and an outlet passage communicating therewith for connecting same between the evaporator and the suction line, valve means normally biased to c'osed position disposed in said outlet passage for controlling the flow of refrigerant therethrough, dual automatically operable control means engaging said valve means, said control means comprising a first diaphragm means for relieving the evaporator pressure at a given maximum value and a second diaphragm means exposed on one side to the pressure in said evaporator and on the other side to the pressure of a thermally expansible fluid.

6. In a temperature control device, for evaporators of the constant refrigerating pressure type, the combination of a thermostatic bulb adapted to be placed within the space to be refrigerated, a valve casing having an inlet and an outlet passage communicating therewith for connecting same between the evaporator and the suction line, valve means normally biased to closed position disposed in said outlet passage for controlling the flow of refrigerant therethrough, dual automatically operable control means engaging said valve means, said control means comprising a first diaphragm means for relieving the evaporator pressure at a given maximum value and a second diaphragm means exposed on one side to the pressure in said evaporator and on the other side to the pressure of said thermostat.

7. In a temperature control device, for evaporators in which the refrigerating pressure is under limited thermostatic control, the combination of a thermostatic bulb adapted to be placed within the space to be refrigerated, a valve casing having an inlet and an outlet passage communicating therewith for connecting same between the evaporator and the suction line, valve means normally biased to closed position disposed in said outlet passage for controlling the flow of refrigerant therethrough, dual automatically operable control means engaging said valve means, said control means comprising a first diaphragm means for relieving the evaporator pressure at a given maximum value and a second diaphragm means exposed on one side to the pressure in said evaporator and on the other side to the pressure of said thermostat.

8. A temperature control device, for evaporators in which the refrigerating pressure is under limited thermostatic control, comprising a valve casing having an inlet and an outlet passage communicating therewith for connecting same between the evaporator and the suction line, valve means normally biased to closed position disposed in said outlet passage for controlling the flow of refrigerant therethrough, dual automatically operable control means engaging said valve means, said control means comprising a first diaphragm means for relieving the evaporator pressure at a given maximum value and a second diaphragm means exposed on one side to the pressure in said evaporator and on the other side to the pressure of a thermally expansible fluid.

ADOLPH F. EVERS, Jr.